C. A. WATSON.
LIFTING JACK.
APPLICATION FILED SEPT. 25, 1920.
1,377,950.
Patented May 10, 1921.
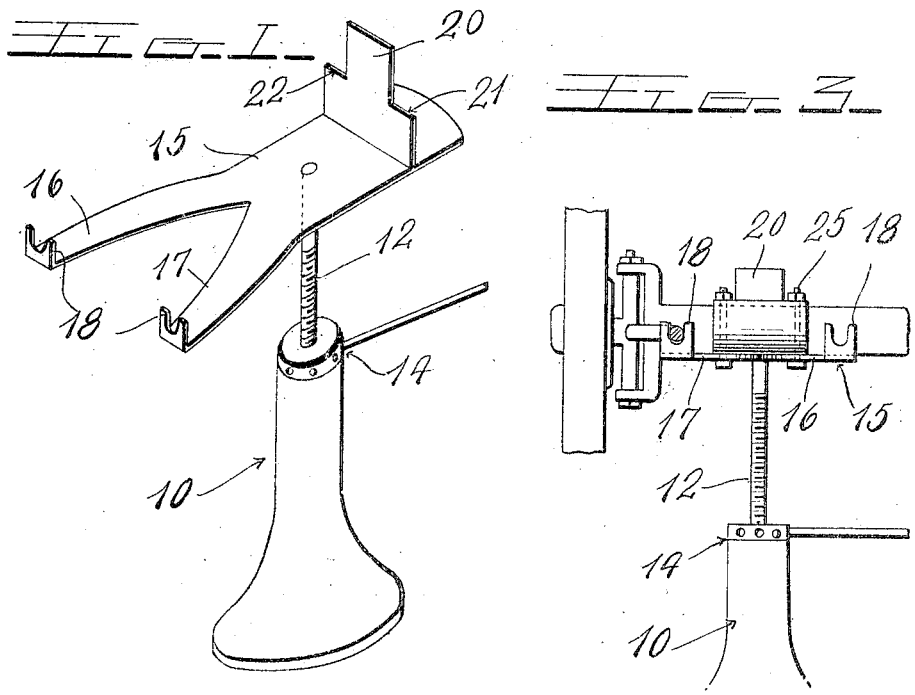
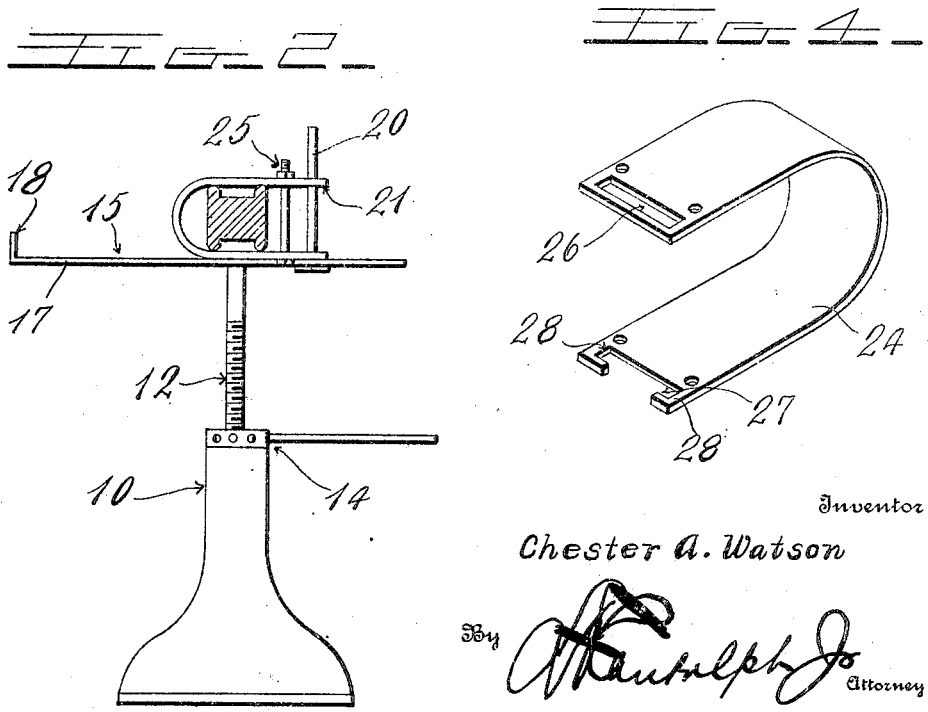
Inventor
Chester A. Watson

UNITED STATES PATENT OFFICE.

CHESTER A. WATSON, OF BALLINGER, TEXAS.

LIFTING-JACK.

1,377,950. Specification of Letters Patent. Patented May 10, 1921.

Application filed September 25, 1920. Serial No. 412,662.

*To all whom it may concern:*

Be it known that I, CHESTER A. WATSON, a citizen of the United States, residing at Ballinger, in the county of Runnels and State of Texas, have invented certain new and useful Improvements in Lifting-Jacks; and I do hereby declare the following to be a full, clear, and exact description of the invention, such as will enable others skilled in the art to which it appertains to make and use the same.

This invention relates to a lifting jack, and more particularly to jacks designed for lifting motor cars, while repairs are being made.

The object is to prevent the slipping of the axle of the vehicle with reference to the upper elements of the jack, and to provide a device which may be effectively used under difficult conditions, as for instance on a side hill, or on moist ground, where slipping is liable to occur.

A further object is to provide means on the upper element of the jack for coöperation with an element to be applied to the axle, in order that positive mechanical engagement may be produced between these elements.

A still further object is to provide an upper element of a jack with a portion designed especially for engagement when the rear axle is to be raised, and another portion having outwardly extending forked arms for use in engaging and retaining an element of the steering gear—when the front axle is being raised—for the purpose of retaining the wheels in normal position with reference to the axle, and preventing them from swinging toward the body of the vehicle, when a tire is being mounted or demounted.

With the foregoing and other objects in view, the invention consists in the novel construction, combination, and arrangement of elements hereinafter described and claimed.

In the accompanying drawing:

Figure 1 is a perspective view of the jack *per se*.

Fig. 2 is a view showing the jack supporting the rear axle of a vehicle.

Fig. 3 is a view showing the jack supporting the front axle, one of the forked arms engaging an element of the steering gear, for preventing the wheel from turning.

Fig. 4 shows more clearly the device intended to surround or partly surround the axle and to be engaged by a device projecting from the upper element of the jack, preventing the axle from slipping during the lifting operation, or after being elevated.

The stationary element of the jack is designated 10, and the movable element, or the shank portion of the latter, is shown at 12, the lifting devices *per se* being shown more or less conventionally and designated 14.

Carried rotatably by the upper end of the element 12 is a transversely extending member 15, one end of which is provided with diverging arms 16 and 17, the end portions of which are upwardly deflected and provided with prongs 18.

The other end of the element 15 is provided with an upwardly projecting device or lug having a central tongue 20 and shoulders 21 and 22, serving the purpose indicated below.

A metallic strap is provided with rectangular openings 26 and 27, one of which receives the tongue 20, the side portions 28 adjacent the opening resting on the shoulders at the sides of the tongue.

When raising a rear axle, the metallic strap 24 is first caused to engage the axle or partly surround the latter, and the jack is lodged in the desired position, with the aforesaid tongue engaging one of the rectangular openings, thereby producing positive mechanical engagement, so that there can be no lateral movement of the axle with reference to the upper element 15 of the jack. The clamping bolts are shown at 25.

When raising the front axle the forked end of the element 15 is employed, one pair of prongs 18 serving to engage an element 31 of the steering mechanism whereby the movement of the wheel angularly, as in steering, is prevented.

The advantages of the construction have been quite fully brought out, and it is apparent that the device is capable of producing substantial results in the direction indicated; and that the cost of manufacture is not appreciably increased. Modifications in construction may be made within the scope of the appended claims.

Having thus described the invention, what I claim is:—

1. In a lifting jack, a stationary element, a movable element coöperating therewith, a transverse member, an upwardly extending lug thereon, and a device for engaging said lug and an axle of a vehicle, for preventing relative angular movement therebetween.

2. In a lifting jack, a stationary element, a movable element coöperating therewith, a transverse member carried by the movable element, a lug projecting from the transverse member and having laterally extending shoulders, a strap for partly surrounding an axle and having an apertured portion engaged by the lug.

3. In a lifting jack, a stationary element, a movable element coöperating therewith, a transverse member, a lug carried by said member and means coöperating with the lug for preventing angular movement of an axle supported by the jack, and diverging arms carried by said transverse member.

4. In a lifting jack, a stationary element, a movable element coöperating therewith, a transverse member mounted on said movable element, an upstanding guide and stop plate carried by one end of said transverse member, the opposite end of said transverse member being flared and bifurcated, the ends of the bifurcated portion of said transverse member being turned upwardly and formed to provide lugs for engaging portions of the steering mechanism of a vehicle and an axle engaging member adapted for coöperation with said upstanding plate.

5. In a lifting jack, a stationary element, a movable element coöperating therewith, a transverse member carried by said movable element, an upstanding member mounted on one end of said transverse member, legs formed on the opposite end of said transverse member, and an axle encircling member adapted to be engaged upon and held in position by the upstanding plate of the transverse member when an axle is to be supported upon and raised by said transverse member.

In testimony whereof I affix my signature in presence of two witnesses.

CHESTER A. WATSON.

Witnesses:
BEULAH WATSON,
SIBYL PARKER.